US012621141B2

(12) United States Patent
Guan et al.

(10) Patent No.: US 12,621,141 B2
(45) Date of Patent: May 5, 2026

(54) COMPUTER SYSTEM, AND SYSTEM MEMORY ENCRYPTION AND DECRYPTION METHOD

(71) Applicant: Shanghai Zhaoxin Semiconductor Co., Ltd., Shanghai (CN)

(72) Inventors: Yingbing Guan, Shanghai (CN); Weilin Wang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 7 days.

(21) Appl. No.: 18/829,677

(22) Filed: Sep. 10, 2024

(65) Prior Publication Data

US 2025/0132909 A1     Apr. 24, 2025

(30) Foreign Application Priority Data

Oct. 24, 2023     (CN) ........................ 202311388104.X

(51) Int. Cl.
*H04L 9/08* (2006.01)

(52) U.S. Cl.
CPC .................................. *H04L 9/088* (2013.01)

(58) Field of Classification Search
CPC ....................................................... H04L 9/088
See application file for complete search history.

(56) References Cited

U.S. PATENT DOCUMENTS

| | | | |
|---|---|---|---|
| 9,405,508 B2 | 8/2016 | Karras | |
| 9,419,951 B1 | 8/2016 | Felsher | |
| 11,455,257 B2 | 9/2022 | Gopal | |
| 2003/0093686 A1 | 5/2003 | Barnes | |
| 2010/0281273 A1* | 11/2010 | Lee | F04B 33/00 |
| | | | 713/193 |
| 2014/0047181 A1 | 2/2014 | Peterson | |
| 2015/0095576 A1 | 4/2015 | Subrahmanyam | |
| 2015/0100753 A1 | 4/2015 | Shen | |
| 2015/0143055 A1 | 5/2015 | Guthrie | |
| 2015/0261615 A1 | 9/2015 | Peterson | |
| 2018/0011802 A1* | 1/2018 | Ndu | G06F 12/0891 |

(Continued)

FOREIGN PATENT DOCUMENTS

| | | | | |
|---|---|---|---|---|
| CN | 112583583 A | * | 3/2021 | ......... G06F 16/1865 |
| CN | 108123800 B | * | 6/2021 | ........... H04L 9/0891 |
| CN | 114357485 A | * | 4/2022 | |

OTHER PUBLICATIONS

Non-Final Office Action issued in U.S. Appl. No. 18/829,648, filed Sep. 10, 2024, mailed Nov. 24, 2025.

(Continued)

*Primary Examiner* — Darshan I Dhruv

(74) *Attorney, Agent, or Firm* — McClure, Qualey & Rodack, LLP

(57) ABSTRACT

A computer system with a processor having an encryption and decryption engine is shown. The encryption and decryption engine includes a key table, which is provided for encryption and decryption of the system memory. In response to a platform setting instruction, the processor reads a key identification code from a key identification code register, and reads control parameters from a control parameter register. Based on the control parameters, the processor manages a key, associated with the key identification code, in the key table.

18 Claims, 13 Drawing Sheets

(56)                 References Cited

U.S. PATENT DOCUMENTS

| | | | |
|---|---|---|---|
| 2018/0067866 A1 | 3/2018 | Shanbhogue | |
| 2019/0042402 A1 | 2/2019 | Chhabra | |
| 2019/0102323 A1 | 4/2019 | Durham | |
| 2019/0102577 A1* | 4/2019 | Gueron | G06F 21/79 |
| 2019/0236022 A1 | 8/2019 | Gopal | |
| 2020/0007332 A1 | 1/2020 | Girkar | |
| 2020/0134208 A1 | 4/2020 | Pappachan | |
| 2020/0201787 A1 | 6/2020 | Shanbhogue | |
| 2020/0409868 A1 | 12/2020 | Durham | |
| 2021/0006395 A1 | 1/2021 | Durham | |
| 2021/0083858 A1* | 3/2021 | Jaquette | H04L 9/0866 |
| 2021/0089471 A1 | 3/2021 | Lu | |
| 2021/0150040 A1 | 5/2021 | Durham | |
| 2021/0200879 A1* | 7/2021 | Gerzon | G06F 9/45558 |
| 2021/0211281 A1 | 7/2021 | Park | |
| 2021/0266143 A1 | 8/2021 | Boue | |
| 2021/0303469 A1 | 9/2021 | Lu | |
| 2022/0100871 A1* | 3/2022 | Huntley | G06F 21/602 |
| 2022/0100911 A1 | 3/2022 | Trikalinou | |
| 2022/0138329 A1 | 5/2022 | Kounavis | |
| 2022/0206958 A1 | 6/2022 | LeMay | |
| 2022/0284135 A1* | 9/2022 | Hubis | G06F 21/602 |
| 2023/0018585 A1 | 1/2023 | Liljestrand | |
| 2023/0101226 A1* | 3/2023 | Feghali | G06F 9/45558 |
| | | | 711/164 |
| 2024/0054080 A1 | 2/2024 | LeMay | |
| 2024/0333501 A1* | 10/2024 | Durham | G06F 21/6218 |
| 2025/0286715 A1* | 9/2025 | Carr | G06F 21/72 |

OTHER PUBLICATIONS

Non-Final Office Action issued in U.S. Appl. No. 18/829,663, filed Sep. 10, 2024, mailed Dec. 18, 2025.

Bellovin; A modem look at telegraph codebooks; 2025; retrieved from the Internet https://www.cs.columbia.edu/~smb/papers/codebooks.pdf; pp. 1-39, as printed. (Year: 2025).

Notice of Allowance dated Mar. 18, 2026, issued in U.S. Appl. No. 18/829,648.

* cited by examiner

| RGCID | CGCID |
|-------|-------|
| 00    | 0x200 |
| 01    | 0x000 |
| 10    | 0x001 |
| 11    | 0x020 |

FIG. 2B

| KeyID1 | Key1 | Key2 | encryption and decryption mode |
| KeyID2 | Key1 | Key2 | encryption and decryption mode |
| KeyID3 | Key1 | Key2 | encryption and decryption mode |
| ... | ... | ... | ... |
| KeyIDn | Key1 | Key2 | encryption and decryption mode |

FIG. 4B convert the target RGCID into a complete GCID (CGCID) by searching the GCID conversion table 206 —— S904 form a complete key identification code KeyID_C —— S906 query the key table 119 based on the KeyID_C and thereby obtains a key —— S908 use the key found in the table looking-up step S908 to encrypt the write data —— S910 write the encrypted write data into the system memory 102 —— S912

1000

| page granular identification code (iID) | setting for encryption and decryption |
|---|---|
| 6'h00 | unified key |
| 6'h01 | without encryption and decryption on the block |
| 6'h02 | key isolation based on just GCID |
| 6'h03 | reserved |
| 6'h04~6'h3B | encryption in granularity of pages (each VM correspond to 56 possible keys) |
| 6'h3C~6'h3F | reserved |

COMPUTER SYSTEM, AND SYSTEM MEMORY ENCRYPTION AND DECRYPTION METHOD

CROSS REFERENCE TO RELATED APPLICATIONS

This application claims priority of China Patent Application No. 202311388104.X, filed on Oct. 24, 2023, the entirety of which is incorporated by reference herein.

BACKGROUND OF THE DISCLOSURE

Field of the Disclosure

The present disclosure relates to computer systems, and in particular to computer systems with system memory encryption and decryption.

Description of the Related Art

Common system memories in computer systems include dynamic random-access memory (DRAM), non-volatile random access memory (NVRAM), and others. Hackers may attack the system memory and obtain data from it. In particular, NVRAM retains data even if its power is interrupted. Serious security issues may occur if plaintext is stored in the system memory.

How to improve the security of data stored in the system memory of a computer system is an important issue in this technical field.

BRIEF SUMMARY OF THE DISCLOSURE

This disclosure proposes a multi-key memory encryption technology (abbreviated as MKMET) achieved by a key table. The different keys are identified by key identification codes (KeyID). In particular, the encryption and decryption engine of the disclosure operates in a high security manner.

A computer system in accordance with an exemplary embodiment of the disclosure includes a processor. The processor has an encryption and decryption engine that encrypts and decrypts the system memory that is coupled to the processor. The encryption and decryption engine includes a key table. In response to a platform setting instruction, the processor reads a key identification code from a key identification code register (EDX), and reads control parameters from a control parameter register (ECX). Based on the control parameters, the processor manages a key, associated with the key identification code, in the key table.

Based on the aforementioned concept, the system memory encryption and decryption method is shown. In response to a platform setting instruction, the method includes reading a key identification code from a key identification code register (EDX), and reading control parameters from a control parameter register (ECX). Based on the control parameters, the method includes managing a key, associated with the key identification code, in a key table. The key table is built within an encryption and decryption engine that operates to encrypt and decrypt the system memory.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein:

FIG. 2B illustrates the implementation details of the GCID conversion table 206 of FIG. 2A in accordance with an exemplary embodiment of the disclosure;

FIG. 4B illustrates the implementation details of the key table 119 of FIG. 4A in accordance with an exemplary embodiment of the disclosure;

DETAILED DESCRIPTION OF THE DISCLOSURE

Figure 1:
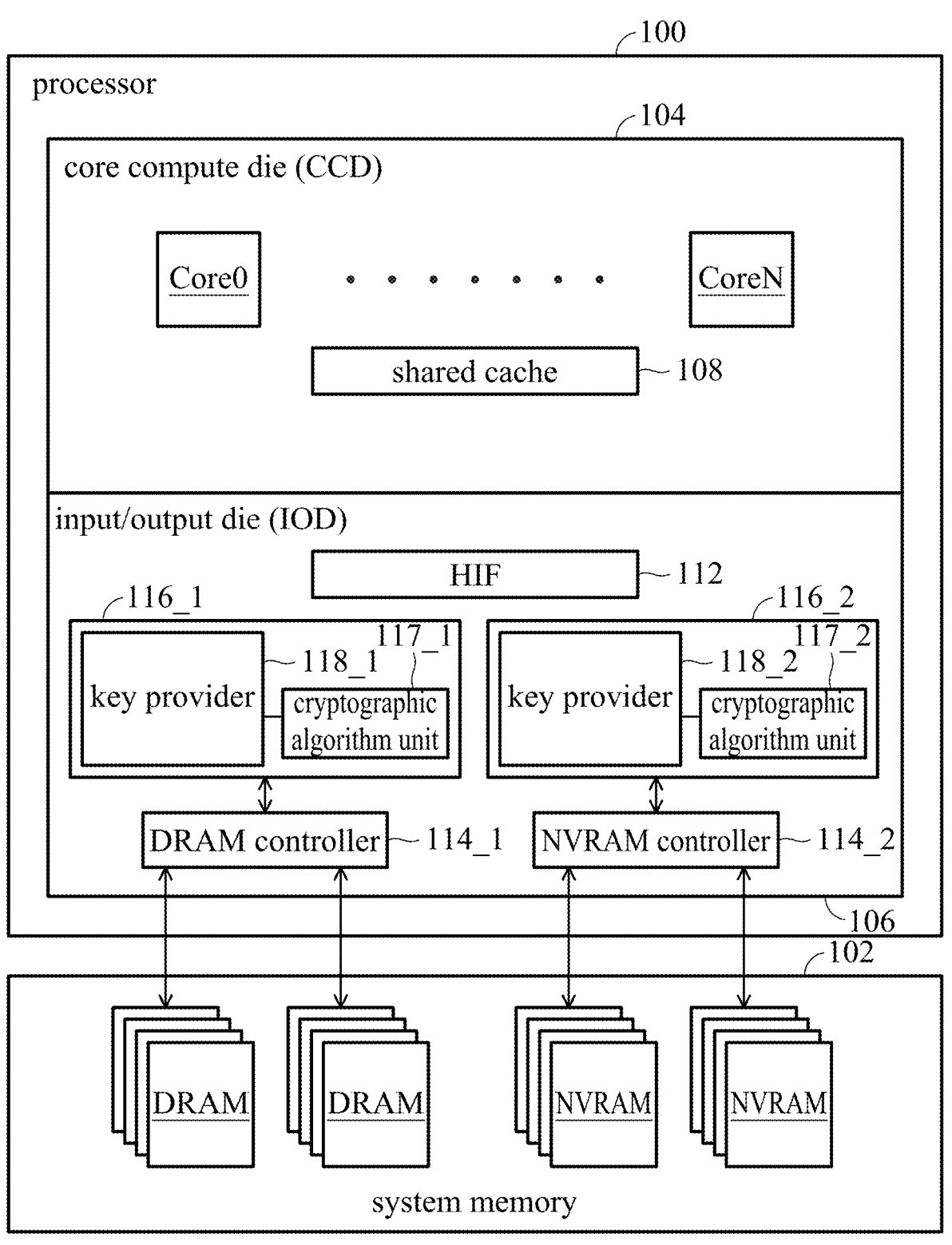
FIG. 1 illustrates a processor 100 that is coupled to a system memory 102 to implement a computer system in accordance with an exemplary embodiment of the disclosure.

The following description lists various embodiments of the present disclosure, but is not intended to limit thereto. The actual scope of the disclosure should be defined according to the scope of the application. The various units, modules, or functional blocks mentioned below may be implemented by a combination of hardware, software, and firmware, and may also include special circuits. Various units or functional blocks are not limited to being implemented separately, but may also be combined together to share certain functions.

This disclosure proposes a multi-key memory encryption technology, (abbreviated as MKMET) which is achieved by a key table. The keys are identified by key identification codes (abbreviated as KeyID).

In particular, in a computer system that has the capability of running virtual machines (VM), each key identification code (KeyID) introduced in the disclosure may include a global context identification code (abbreviated as GCID). For example, the global context identification code (GCID) of the host operating system (Host OS) may be 0, and the global context identification code (GCID) of a virtual machine monitor (abbreviated as VMM, which is a module within the host operating system) may also be 0. The virtual machines may use non-zero global context identification codes (GCID) to distinguish the key identification codes (KeyID) used in the different virtual machines from the key identification code used by the host. In this way, the key identification code (KeyID) may be configured in granularity of GCID. By the different values of GCID, not only the host is safely isolated from the virtual machines, the isolation between the different virtual machines are clear. In an exemplary embodiment, the key identification code (KeyID) does not only include the global context identification code (GCID). The KeyID granularity is more detailed to pages. Specifically, the key identification code (KeyID) may include two parts. The first part (for example, the more significant bits of KeyID) shows the GCID, and the second part (for example, the less significant bits KeyID) shows the isolation ID (abbreviated as iID, which is named page granular identification code in this paper). In this way, under the same global context (for example, all in the host, or all in the same virtual machine), the key identification code (KeyID) is further configured at page granular to further improve security. In an exemplary embodiment, the global context identification code (GCID) of the host is set to 0 by default. The global context identification code (GCID) of each virtual machine is defined when the virtual machine is built up. As for the page granular identification code (iID), it is defined when a page table is created.

In an exemplary embodiment, the global context identification code (GCID) may be a reduced global context identification code (abbreviated as RGCID) either a complete global context identification code (abbreviated as CGCID). The reduced global context identification code (RGCID) has the fewer bits (for example, 2 bits) and is adopted within the processor's core to save storage space. The complete global context identification code (CGCID) has a larger number of bits (for example, 10 bits) and is adopted outside the processor's core. The conversion between CGCID and RGCID is achieved by a global context identification code conversion table (GCID conversion table). The specific conversion technology is detailed later.

Furthermore, in some exemplary embodiments, an encryption and decryption engine operating in a highly secure manner is shown. In an exemplary embodiment, the system memory is allocated to provide a first memory-mapped input and output (MMIO) space to manage the encryption and decryption engine, and only the secure micro-operations (secure uops) executed in response to the instructions of privilege level 0 (ring 0) are permitted to access the first MMIO space. The secure uops are different from the general uops which access the data space of the system memory. The general uops may be caused by instructions (such as the MOV instruction) running at the lower privilege level, such as the privilege level 1 (ring 1), the privilege level 2 (ring 2), or the privilege level 3 (ring 3). In this way, the security of the encryption and decryption engine is greatly improved.

To implement the MKMET technology, the encryption and decryption engine encrypts and decrypts the system memory based on the keys as well as the encryption and decryption parameters (control parameters) obtained by searching a key table according to KeyIDs. This disclosure further introduces a platform setting instruction PlatformSet that may only run at a privilege level 0. General software cannot run at the privilege level 0, so it cannot use this platform setting instruction PlatformSet to access the key table, which significantly improves system security. In an exemplary embodiment, general software refers to software that cannot run on the core at privilege level 0, which may be applications, device drivers, and other software that do not belong to the operating system. Non-general software (secure software) may refer to software that can run on the core at privilege level 0, such as the operating system.

In some exemplary embodiments, the platform setting instruction PlatformSet is more flexible. The system memory may be further allocated to provide a second MMIO space restricted to be access by these secure uops. The second MMIO space is configured to manage another high security function engine (e.g., an AI acceleration engine). By asserting a flag (for example, setting the value of the AX register to 2), the platform setting instruction PlatformSet may be switched to implement the secure access to the second MMIO space, to securely configure the high security function engine (the AI acceleration engine).

FIG. 1 illustrates a processor 100 that is coupled to a system memory 102 to implement a computer system in accordance with an exemplary embodiment of the disclosure. The system memory 102 includes a dynamic random access memory (DRAM) and non-volatile random access memory (NVRAM). The processor 100 encrypts the data before writing it into the system memory 102, and decrypts the data taken from the system memory 102.

As shown in FIG. 1, the processor 100 includes a core compute die (abbreviated as CCD) 104, and an input/output die (abbreviated as IOD) 106. The core compute die (CCD) 104 includes a plurality of cores Core0~CoreN, and a shared cache (such as LLC) 108 shared by the cores Core0~CoreN. The input/output die (IOD) 106 communicates with the cores Core0~CoreN through the host interconnect fabric (HIF) 112.

To read and write the DRAM in the system memory 102, the input and output die (IOD) 106 provides a DRAM controller 114_1 and an encryption and decryption engine 116_1. The encryption and decryption engine 116_1 includes a cryptographic algorithm unit 117_1 and a key provider 118_1. When the DRAM controller 114_1 reads and writes the DRAM as instructed by the cores Core0~CoreN, the encryption and decryption engine 116_1 operates to encrypt the write data and to decrypt the read data. The keys required in the cryptographic algorithm unit 117_1 for data encryption and decryption are obtained from the key provider 118_1. In particular, the key provider 118_1 provides keys based on the concept of global context isolation as mentioned above; data security is significantly improved.

A similar design may also be applied to read and write the NVRAM in the system memory 102. To read and write the NVRAM in the system memory 102, the input and output die (IOD) 106 provides a NVRAM controller 114_2 and an encryption and decryption engine 116_2. The encryption and decryption engine 116_2 includes a cryptographic algorithm unit 117_2 and a key provider 118_2. When the NVRAM controller 114_2 reads and writes the NVRAM as instructed by the cores Core0~CoreN, the encryption and decryption engine 116_2 operates to encrypt the write data and to decrypt the read data. The keys required in the cryptographic algorithm unit 117_2 for data encryption and decryption are provided by the key provider 118_2, and the key provider 118_2 obtains the keys from a non-volatile storage space. In particular, the key provider 118_2 provides keys based on the concept of global context isolation as mentioned above; data security is significantly improved.

In an exemplary embodiment, corresponding to the same key identification code (KeyID), the key supplied by the key provider 118_2 may be completely different from the key supplied by the key provider 118_1. For example, corresponding to a KeyID 1, the key provided by key provider 118_1 for a specific global context may be completely different from the key provided by key provider 118_2 for the same global context.

In addition, unlike FIG. 1, which uses two dies to implement the processor 100, another implementation is to integrate the CCD 104 and the IOD 106 into a single die. Thus, the time required for communication between two separated dies is saved. Such an implementation allows the cores Core0~CoreN to access the system memory 102 at a faster speed.

In this disclosure, some model-specific registers (MSRs) are configured to implement the above encryption and decryption technology. The model-specific registers (MSRs) are:

SMED_EXCLUDE_MASK, and SMED_EXCLUDE_BASE: specifying an encryption-free and decryption-free zone, such as an address range of the system memory 102 allocated for a memory-mapped input/output (MMIO) technology, or an address range of the system memory 102 allocated for building a Basic Input Output System (BIOS). These zones are not suitable for encryption.

When the processor 100 activates the encryption and decryption function of the system memory 102, it may use a CPUID instruction to enumerate the above MSRs and their addresses. The above MSRs may be configured by the BIOS executed in the system booting-up procedure. According to design needs, the above MSRs may be provided within the cores (for example, Core0, Core1 . . . , etc.). In another exemplary embodiment, the MSRs are provided within the HIF 112 and/or the encryption and decryption engines 116_1 and 116_2, to be accessed by the cores.

When the BIOS configures the MSRs, the microcode unit (ucode) may transfer the contents of the MSRs SMED_EXCLUDE_MASK, and SMED_EXCLUDE_BASE to the HIF 112. When a core of Core0~CoreN issues a data read/write request, the HIF 112 may check the MSRs SMED_EXCLUDE_MASK and SMED_EXCLUDE_BASE to determine whether the access target is within an encryption-free and decryption-free zone. The specific judgment manner is described in detail later.

The design of the MSRs SMED_EXCLUDE_MASK and SMED_EXCLUDE_BASE is discussed in detail below.

In an exemplary embodiment, the MSR SMED_EXCLUDE_MASK can include the following design.

A particular bit (for example, bit 11) of the MSR SMED_EXCLUDE_MASK is used to indicate whether the MSR SMED_EXCLUDE_MASK and its related MSR SMED_EXCLUDE_BASE are combined to determine whether an access address falls within an encryption-free and decryption-free zone. In an exemplary embodiment, when the particular bit of the MSR SMED_EXCLUDE_MASK is 1, it means that the MSR SMED_EXCLUDE_MASK and its related MSR SMED_EXCLUDE_BASE are combined to determine whether a requested address belongs to an encryption-free and decryption-free zone; otherwise, there is no need to check the MSRs MSR SMED_EXCLUDE_MASK and SMED_EXCLUDE_BASE to determine whether the requested address belongs to an encryption-free and decryption-free zone or not.

In an exemplary implementation, the bits [MaxPhysADDR-1:12] of the MSR SMED_EXCLUDE_MASK are used to define a mask for the encryption-free and decryption-free zone. MaxPhysADDR is the maximum bit of a physical address. In an exemplary embodiment, MaxPhysADDR is 64. The bits [MaxPhysADDR-1:12] of the MSR SMED_EXCLUDE_BASE are used to indicate the base address of the encryption-free and decryption-free zone. According to the mask obtained from the MSR SMED_EXCLUDE_MASK and the base address obtained from the MSR SMED_EXCLUDE_BASE, the HIF 112 may determine whether an access address falls into the defined encryption-free and decryption-free zone. In an exemplary embodiment, the HIF 112 determines whether requested address ADDR belongs to the defined encryption-free and decryption-free zone by: combining the address ADDR with the mask obtained from the MSR SMED_EXCLUDE_MASK by a bitwise AND operation, to generate a first calculation result; and performing a bitwise AND operation on the base address obtained from the MSR SMED_EXCLUDE_BASE and the mask obtained from the MSR SMED_EXCLUDE_MASK, to generate the second calculation result; and comparing the first calculation result with the second calculation result. If the first calculation result and the second calculation result are the same, it means that the address ADDR falls into the encryption-free and decryption-free zone; otherwise, it means that the address ADDR does not fall into the encryption-free and decryption-free zone.

Figure 2A:
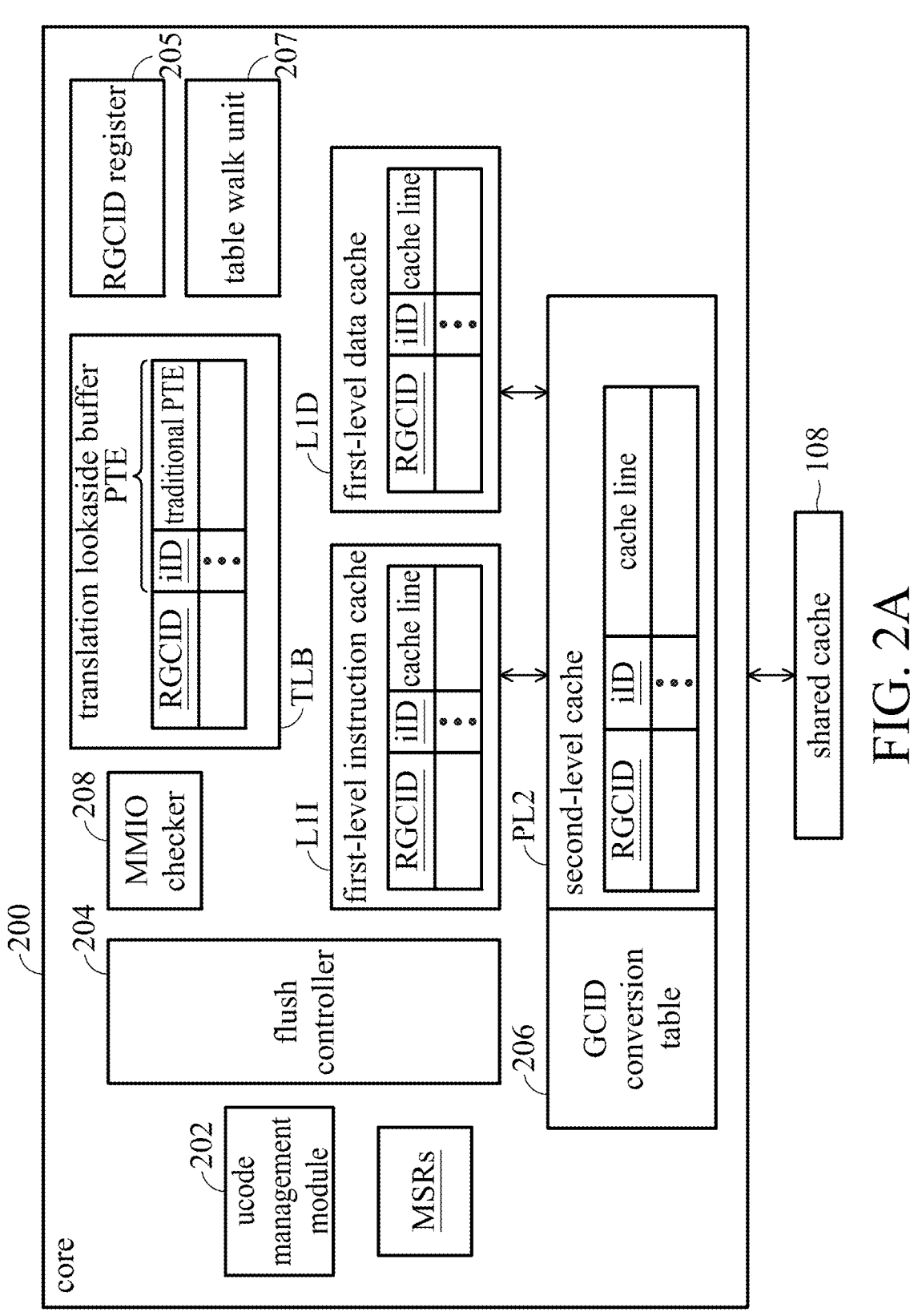
FIG. 2A illustrates the implementation details of the core Core0, . . . , or CoreN of the CCD 104 in accordance with an exemplary embodiment of the disclosure.
Figure 3:
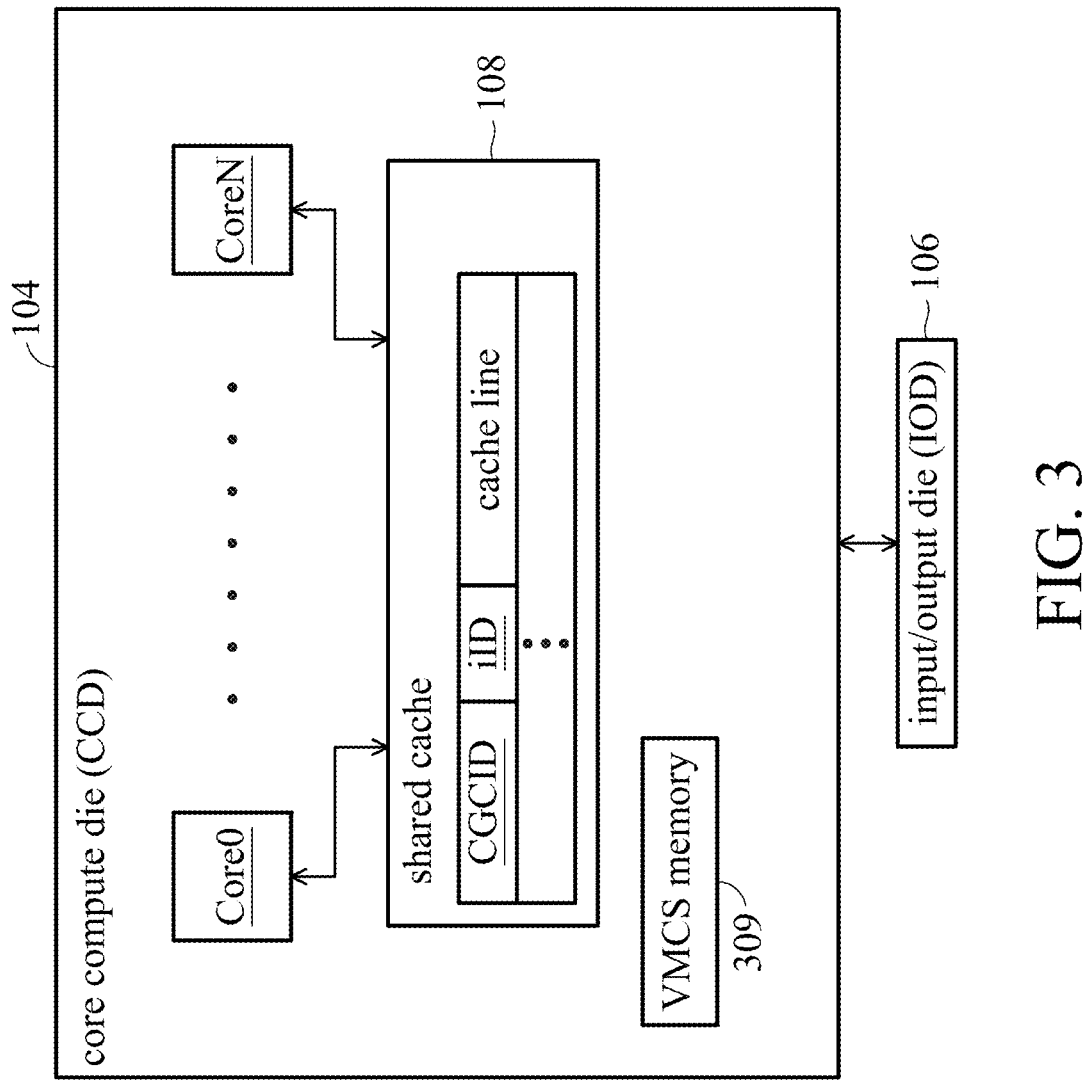
FIG. 3 illustrates the other details of the CCD 104 in accordance with an exemplary embodiment of the disclosure.
Figure 4A:
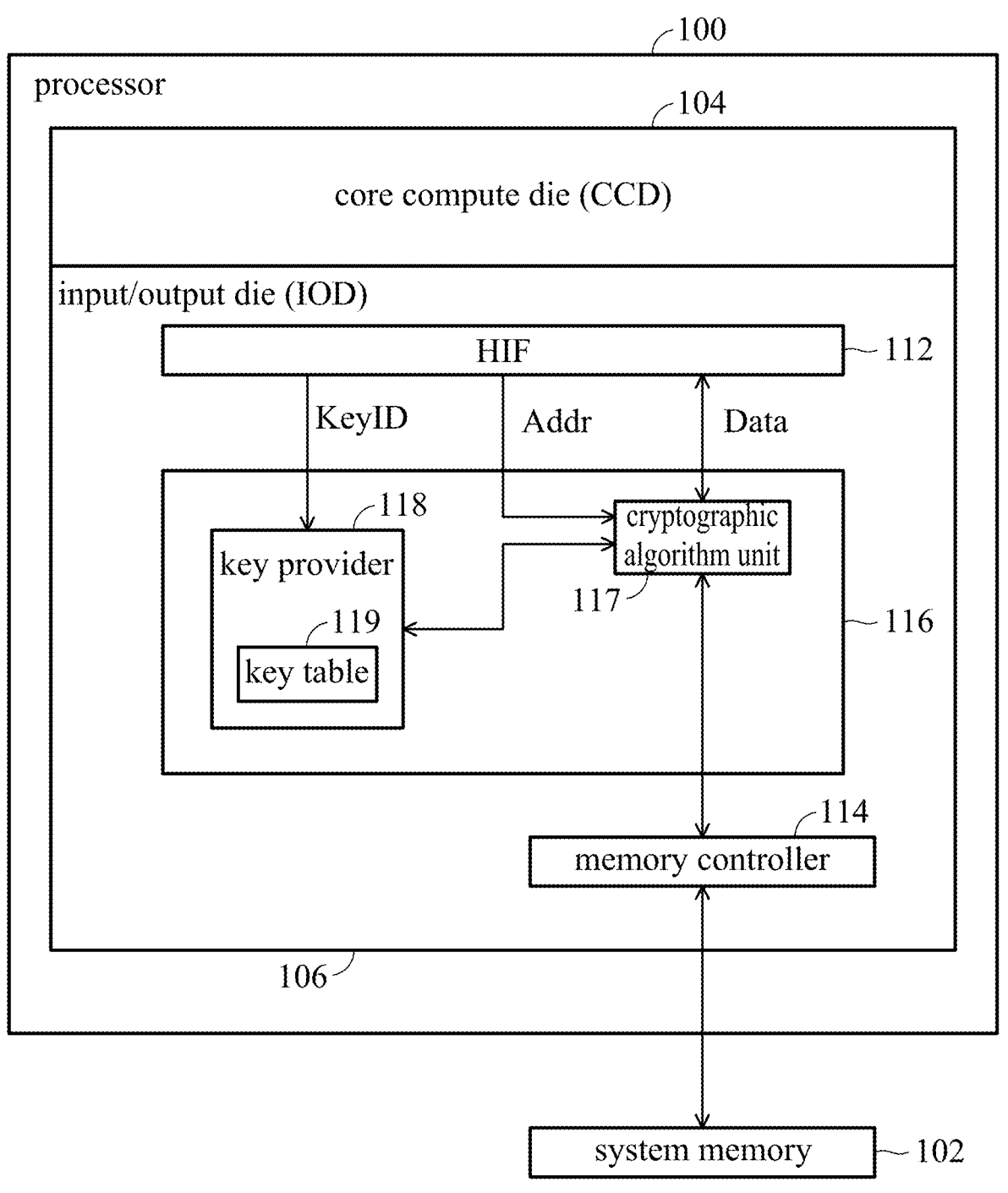
FIG. 4A illustrates implementation details of IOD 106 in accordance with an exemplary embodiment of the disclosure.

The following describes the implementation details of the MKMET of the disclosure. FIG. 2A illustrates the implementation details of the core Core0, . . . , or CoreN of the CCD 104 in accordance with an exemplary embodiment of the disclosure. FIG. 2B illustrates the implementation details of the GCID conversion table 206 of FIG. 2A in accordance with an exemplary embodiment of the disclosure. FIG. 3 illustrates the other details of the CCD 104 in accordance with an exemplary embodiment of the disclosure. FIG. 4A illustrates implementation details of IOD 106 in accordance with an exemplary embodiment of the disclosure. FIG. 4B illustrates the implementation details of the key table 119 of FIG. 4A in accordance with an exemplary embodiment of the disclosure.

Referring to FIG. 2A, the core 200 includes a microcode (ucode) management module 202, an in-core cache structure (including a first-level instruction cache L1I, a first-level data cache LID, and a second-level cache PL2), a translation lookaside buffer (TLB), a flush controller 204 (used to flush the cached contents to the system memory 102), a reduced GCID (RGCID) register 205, a table walk unit 207, a GCID conversion table 206, the aforementioned MSRs, and an MMIO checker 208 (to safely operate the encryption and decryption engine 116_1/116_2). In an exemplary embodiment, when logging out from a virtual machine, the core 200 may issue a flush instruction (such as CLFLUSH, CKEYFLUSH, etc.) to operate the flush controller 204 to flush the cache lines related to the virtual machine.

As shown in FIG. 2A, the RGCID register 205 is operative to store a reduced global context identification code RGCID (in an exemplary embodiment, the length of the RGCID is 2 bits). The GCID conversion table 206 is provided for conversion between the reduced global context identification codes (RGCID) and the complete global context identification codes (CGCID). In an exemplary embodiment, in response to an event that causes a global context change by logging in a virtual machine, switching between virtual machines, or logging out from a virtual machine (or the similar actions), the microcode management module 202 updates the GCID conversion table 206 to map the RGCIDs to their correct CGCIDs.

FIG. 2B illustrates the implementation details of the GCID conversion table 206 in FIG. 2A in accordance with an exemplary embodiment of the disclosure. As shown in FIG. 2B, the GCID conversion table 206 includes an RGCID column and a CGCID column. Taking the RGCID column as an example, binary numbers 00, 01, 10, or 11 may represent the different RGCID values. According to the change of the global context (for example, to log in a virtual machine, to switch between the different virtual machines, or to log out a virtual machine, etc.), the core 200 allocates one RGCID value to correspond to the CGCID of the new global context. When there is no free RGCID value in the GCID conversion table 206, the core 200 may select the CGCID of an old global context, clear its mapping to the RGCID, and then map the released RGCID value to the CGCID of the new global context. In an exemplary embodiment, the GCID conversion table 206 may be managed in the second level cache PL2.

When logging in/switching to/logging out a target virtual machine, the core 200 converts the CGCID of the host or the target virtual machine into an RGCID with update of the GCID conversion table 206, and stores the RGCID in the RGCID register 205 (the detailed process is described in detail later based on FIG. 6). Then, the host or the target virtual machine may encrypt and decrypt the data in the system memory according to the RGCID obtained from the RGCID register 205.

As shown in FIG. 2A, the translation lookaside buffer TLB includes multiple entries, and each entry stores an RGCID value and includes a page table entry (PTE). The PTE stores the page granular identification code iID (which is 6 bits long in an exemplary embodiment), and the contents of a traditional PTE. In an exemplary embodiment, the traditional PTE includes fields such as a virtual address (abbreviated as VA), a physical address (abbreviated as PA), and so on. With the help of a PTE stored in the translation lookaside buffer TLB, the core 200 converts a virtual address VA of an instruction or data into a physical address PA, and accesses the instruction or data on the system memory 102 based on the obtained physical address PA. The in-core cache structure (including the first-level instruction cache L1I, the first-level data cache LID, and the second-level cache PL2) also contains multiple entries, each entry includes a cache line, an RGCID value, and page granular identification code iID. According to the running host or the running target virtual machine, the page table entries (PTE) related to the host or the target virtual machine are programmed into the translation lookaside buffer TLB, and the data related to the host or the target virtual machine are loaded into the in-core cache structure. The reduced global context identification code (RGCID) and page granular identification code (iID) may form a simplified key identification code (which is {RGCID, iID}, hereinafter referred to as KeyID_R). Compared with a complete context identification code (CGCID), a global context identification code (RGCID) uses the fewer bits, thereby effectively saving cache space in the core 200. When the core 200 issues a data access request to the outside of the core 200, it first generates a simplified key identification code KeyID_R according to the target address of the data access, and then checks the GCID conversion table 206 to convert the simplified key identification code KeyID_R (={RGCID, iID}) into a complete key identification code (which is {CGCID, iID}, hereinafter referred to as KeyID_C). When the core 200 receives data from outside the core 200 (e.g., data of a page table entry PTE or a cache line), the complete key identification code KeyID_C associated with the received data must be converted to a simplified key identification code KeyID_R through the GCID conversion table 206. In conjunction with FIGS. 7, 8, and 9, the following describes in detail how to generate the simplified key identification code KeyID_R according to the target address of data access, the translation lookaside buffer TLB, the RGCID register 205, and the table walk unit 207.

In another exemplary embodiment, the core 200 does not include the RGCID register 205, nor the GCID conversion table 206. In each entry of the translation lookaside buffer TLB and the in-core cache structure, the recorded global context identification code is the complete global context identification code (CGCID) rather than the reduced global context identification code (RGCID). It is not intended to limit the form of the global context identification code (GCID).

Referring to FIG. 3, in the shared cache 108 (for example, an LLC) shared by the different cores Core0~CoreN, each cache line is accompanied with a complete key identification code KeyID_C that includes a complete global context identification code (CGCID) as well as a page granular identification code iID (KeyID_C={CGCID, iID}). The CCD 114 may send the complete key identification code KeyID_C (={CGCID, iID}) together with the physical address of read/write operation to the IOD 106.

When the virtual machine monitor (VMM) starts a virtual machine, a virtual machine control structure (VMCS) from the system memory 102 is cached in the VMCS memory 309. Each core obtains the complete global context identification code (CGCID, for example, 10 bits long) of the virtual machine from the virtual machine control structure VMCS, and then updates the GCID conversion table 206 to map a reduced global context identification code (RGCID, for example, 2 bits long) to the obtained CGCID. When each core performs data accessing, it first obtains the page granular identification code iID (e.g., 6 bits long) from the translation lookaside buffer TLB based on the virtual address VA of the data accessed. If the page granular identification code iID cannot be obtained from the translation lookaside buffer TLB, a table walk unit 207 reads a page table in the system memory 102 to obtain the page granular identification code iID. Then, each core converts the reduced GCID (RGCID) obtained from the RGCID register 205 into the complete GCID (CGCID), and generates the complete key identification code KeyID_C based on the complete GCID (CGCID) and the page granular identification code iID. Each core then applies the complete key identification code KeyID_C to data accessing.

The CCD 104 passes the complete key identification code (KeyID_C), together with the data address (Addr) and the data (Data), to the IOD 106. The core/cache tracks the corresponding key identification code KeyID for each encrypted block.

The DRAM controller 114_1 and the NVRAM controller 114_2 in FIG. 1 are collectively referred to as the system memory controller 114 in FIG. 4A. The encryption and decryption engines 116_1 and 116_2 in FIG. 1 are collectively referred to as the encryption and decryption engine 116 of FIG. 4A. The cryptographic algorithm units 117_1 and 117_2 in FIG. 1 are collectively referred to as the cryptographic algorithm unit 117 in FIG. 4A. The key providers 118_1 and 118_2 in FIG. 1 are collectively referred to as the key providers 118 in FIG. 4A. The key provider 118 includes a key table 119. The system memory controller 114 uses the encryption and decryption engine 116 to implement encryption and decryption of the system memory 102. The key used by the cryptographic algorithm unit 117 is obtained from the key provider 118 which queries the key table 119 based on the complete key identification code KeyID_C. In an exemplary embodiment, the cryptographic algorithm unit 117 supports XTS mode cryptographic algorithms (e.g., AES-XTS 128 and AES-XTS 256 cryptographic algorithms) and an SM4 block message cipher algorithm. Thus, the HIF 112 also provides the address Addr (without the key identification code KeyID) to the cryptographic algorithm unit 117 to implement perturbation on the encryption and make the encrypted result of data more secure. In an exemplary embodiment, encryption perturbation means that the cryptographic algorithm unit 117 may first encrypt the address (Addr) to generate an encryption key, and then use the generated encryption key to encrypt data. In another exemplary embodiment, encryption perturbation means that the cryptographic algorithm unit 117 first XORs the address (Addr) and the data (Data) to generate an XOR result, and then encrypts the XOR result.

In addition, corresponding to the cryptographic algorithm of the XTS mode (for example, AES-XTS 128, or AES-XTS 256 cryptographic algorithm), the key corresponding to a complete key identification code KeyID_C is further divide into a first partial key Key1 and a second partial key Key1 for encryption. In an exemplary embodiment, the cryptographic algorithm supported by the cryptographic algorithm unit 117 is an SM4 block message cipher algorithm. In another exemplary embodiment, this application also supports cryptographic algorithms in various XTS modes, or cryptographic algorithms in any other modes (such as ECB, CBC, CFB, OFB, CTR, etc. modes). This application does not intend to limit to any cryptographic algorithm, nor any specific cipher modes.

In particular, the complete key identification code KeyID_C used for indexing in the key table 119 is a combination of the complete GCID (CGCID) and the page granular identification code (iID). The host and the virtual machines correspond to their individual complete key identification codes (KeyID), which result in global context isolated keys, and isolated encryption is achieved.

FIG. 4B illustrates the implementation details of the key table 119 of FIG. 4A in accordance with an exemplary embodiment of the disclosure. The key table 119 is protected from being accessed by software. As shown in FIG. 4B, taking the XTS mode as an example, corresponding to each key identification code of KeyID1~KeyIDn, the key table 119 not only stores its two partial keys Key1 and Key2 (for example, each is a 64B tweak key), but also stores its encryption and decryption mode. The possible encryption and decryption modes may include: encryption and decryption by looking up the key table; no encryption and decryption; and encryption and decryption based on an unified key (or a constant key). In an exemplary embodiment, the field of encryption and decryption mode includes: bit 0, for selecting the AES-XTS 128 cryptographic algorithm; bit 1, for selecting the AES-XTS 256 cryptographic algorithm; bit 2, for selecting the SM4 block message cipher algorithm; and bit 3, for disabling the encryption and decryption on the system memory. For example, when the setting about the encryption and decryption mode is 0001, it means that the AES-XTS 128 cryptographic algorithm is applied to the encryption and decryption of the system memory; when the setting about the encryption and decryption mode is 0010, it means that the AES-XTS 256 cryptographic algorithm is applied to the encryption and decryption of the system memory; when the setting about the encryption and decryption mode is 0100, it means that the SM4 block message cipher is applied to the encryption and decryption of the system memory; and, when the setting about the encryption and decryption mode is 1000, it means that encryption and decryption on the system memory are disabled. In an exemplary embodiment, when the page granular identification code iID is 0, it means that a unified key is used for encryption and decryption of the entire system memory. When no key identification code KeyID is managed in the key table 119, the encryption and decryption of the entire system memory are also based on a unified key.

Figure 5:
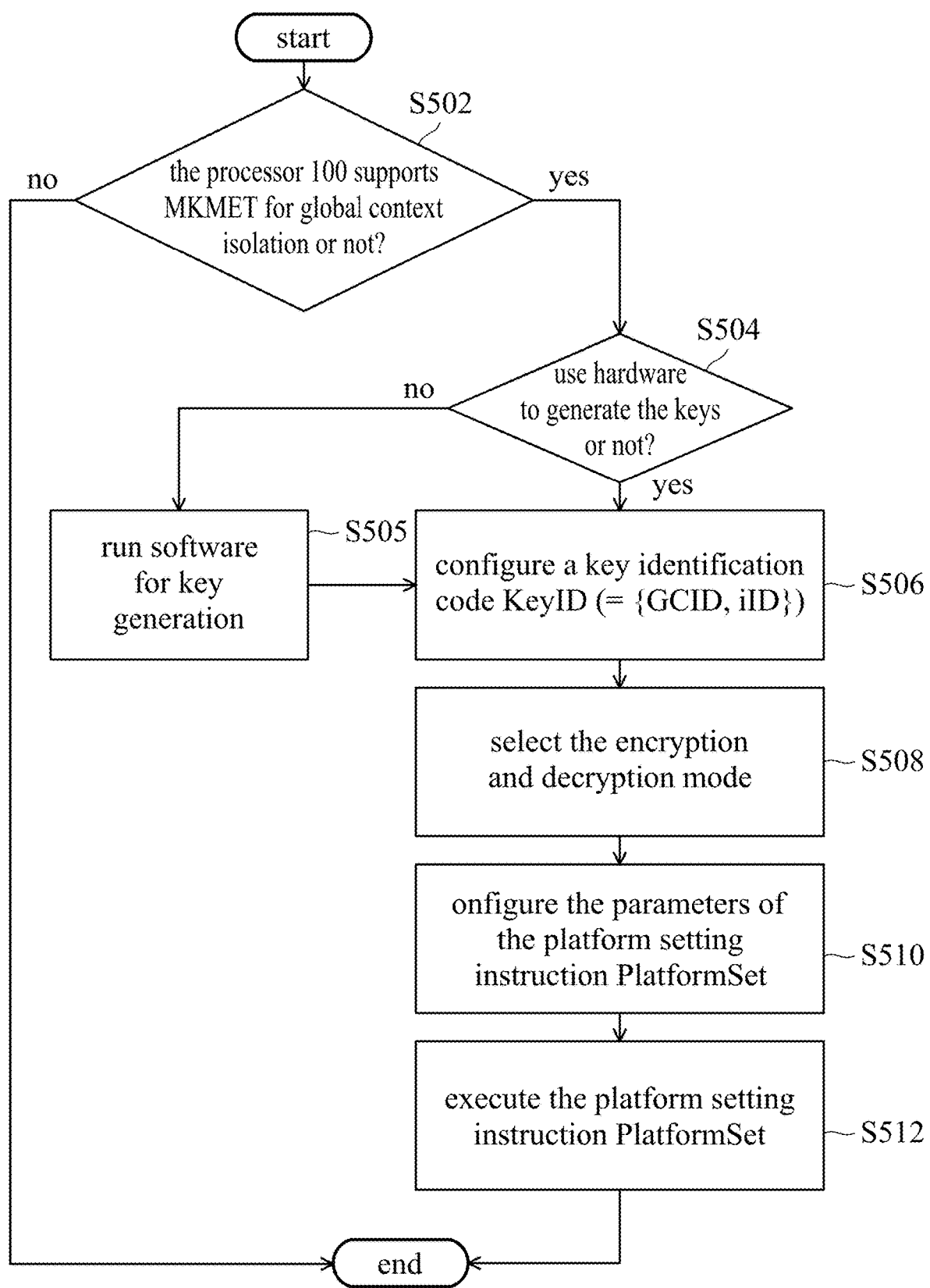
FIG. 5 illustrates the generation process of the key table 119 in accordance with an exemplary embodiment of the disclosure.

FIG. 5 illustrates the generation process of the key table 119 in accordance with an exemplary embodiment of the disclosure.

In step S502, it is checked whether the processor 100 supports MKMET for global context isolation. If not, the process ends. Otherwise, the process proceeds to step S504 to select whether to use hardware to generate the keys. If "No", step S505 is executed to run software for key generation and then step S506 is executed. If "Yes", step S506 is executed directly.

In step S506, a key identification code KeyID (={GCID, iID}) is configured. Step S508 selects the encryption and decryption mode. In an exemplary embodiment, the optional encryption and decryption modes include: AES-XTS 128 cryptographic algorithm, AES-XTS 256 cryptographic algorithm, SM4 block message cipher algorithm, or disabled encryption and decryption.

In step S510, the parameters of the platform setting instruction PlatformSet are configured based on steps S504, S505, S506, and S508. How to configure the parameters of the platform setting instruction PlatformSet is described in detail later. Step S512 executes the platform setting instruction PlatformSet to add a new key entry into the key table 119 (or modify an existing key entry). Then, the process ends.

The keys generated by hardware are not be exposed to software. How the platform setting instruction PlatformSet securely builds the key table 119 is introduced later.

In addition to the key table 119, the generation of another table in this disclosure—the GCID conversion table 206—is discussed as follows.

Figure 6:
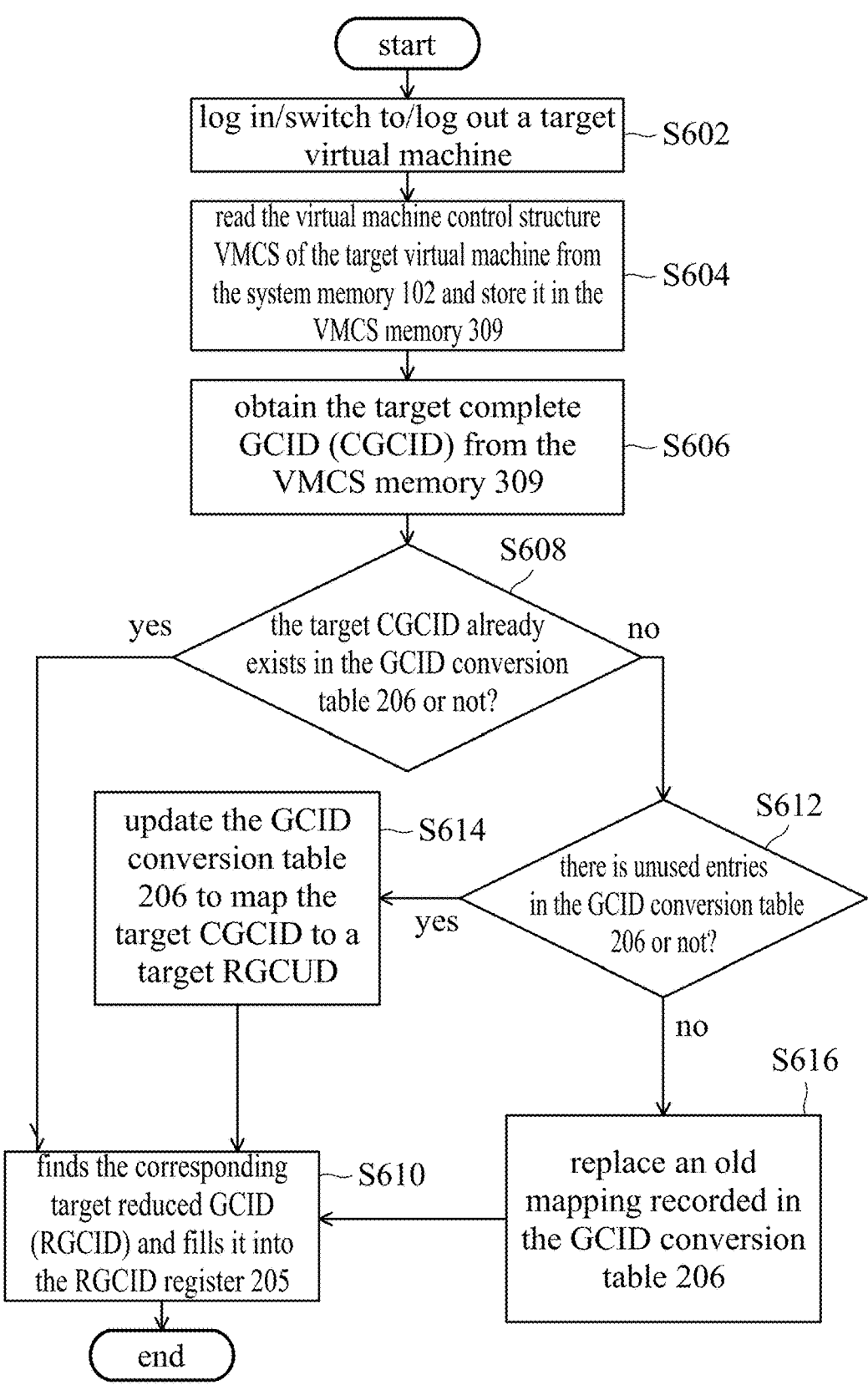
FIG. 6 illustrates the process of establishing the GCID conversion table 206 in accordance with an exemplary embodiment of the disclosure.

FIG. 6 illustrates the process of establishing the GCID conversion table 206 in accordance with an exemplary embodiment of the disclosure. The process is described in detail below with reference to FIGS. 2A, 2B, and 3.

Step S602 logs in/switches to/logs out the target virtual machine. Specifically, when a vemreusme, vmlaunce instruction is executed or a vmexit event is triggered, the operation of logging-in/switching-to/logging-out the target virtual machine is triggered. Step S604 reads the virtual machine control structure VMCS of the target virtual machine from the system memory 102 and stores it in the VMCS memory 309 shown in FIG. 3. Step S606 obtains the target complete GCID (CGCID) from the VMCS memory 309. It should be noted that when logging out the target virtual machine in step S602, the core 200 does not execute steps S604 and S606, but directly clears the target complete GCID (CGCID) to 0, and proceeds to step S608.

In step S608, it is determined whether the target complete GCID (CGCID) already exists in the GCID conversion table 206. If so, step S610 finds the corresponding target reduced GCID (RGCID) from the GCID conversion table 206, and fills it into the RGCID register 205. If not, step S612 determines whether there is free space (or unused entries) in the GCID conversion table 206. If there is still free space (or unused entries), step S614 add the new mapping into the GCID conversion table 206, so that the target complete GCID (CGCID) mapped to a target reduced GCID (RGCID) is recorded in the GCID conversion table 206, and then, step S610 is performed to fill the target reduced GCID (RGCID) into the RGCID register 205. If there is no free space, step S616 replaces an old mapping recorded in the GCID conversion table 206 (for example, a mapping information that has not been referred to for the longest time) and, accordingly, all cashed data related to the replaced RGCID is flushed to the system memory. As for the target RGCID of the new mapping, it is further filled in the RGCID register 205 in step S610.

In summary, when logging-in/switching-to/logging-out the target virtual machine (that is, when the global context changes in response to the execution of an instruction such as vmresume/vmlaunch, or the trigger of the event vmexit), the microcode management module 202 operates to update the GCID table 206 to record the new mapping. Corresponding to the replaced mapping presented in the GCID table 206, the microcode management module 202 flushes the cached data of the replaced global context. A flush instruction CKEYFLUSH used in cache flushing is discussed later.

Referring to FIG. 2A, when the core executes a data access instruction (for example, an MOV instruction) issued by the virtual machine, it first accesses the translation lookaside buffer TLB to obtain a physical address related to the virtual address issued for the data accessing. In addition, the corresponding reduced GCID (RGCID) and the page granular identification code iID are also obtained from the translation lookaside buffer TLB (which will be described in detail later in conjunction with FIGS. 2A and 7). Then, based on the physical address of the data accessing, the reduced GCID (RGCID), and the page granular identification code iID, the in-core cache structure and the shared cache are visited to complete the data access (this will be described in detail later in conjunction with FIGS. 2A, 3, 4A, 4B, 8, and 9).

Figure 7:
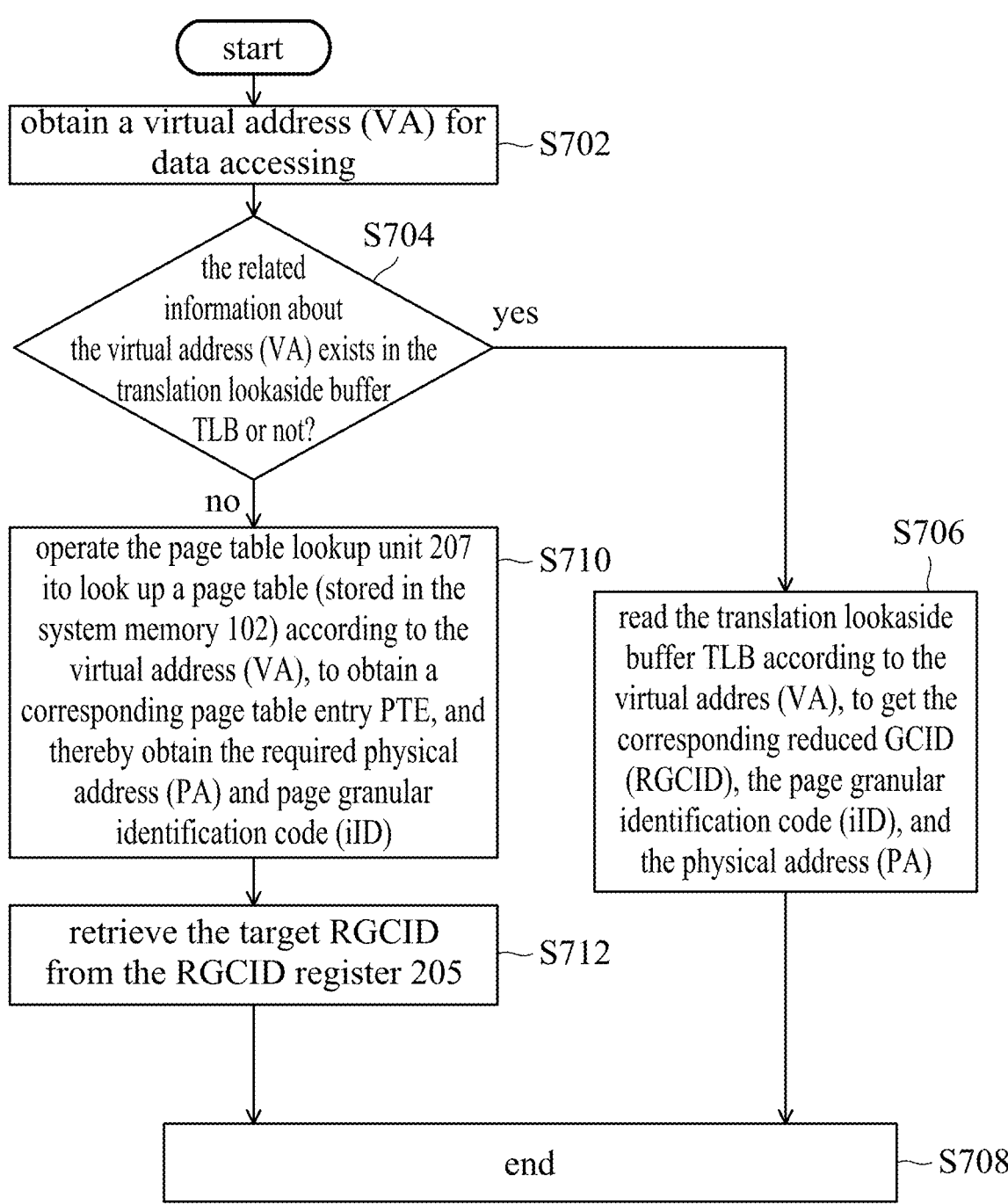
FIG. 7 illustrates the simplified key identification code KeyID_R (={RGCID, iID}) acquisition procedure which is performed in response to a read/write instruction in accordance with an exemplary embodiment of the disclosure.

FIG. 7 illustrates the simplified key identification code KeyID_R (={RGCID, iID}) acquisition procedure which is performed in response to a read/write instruction in accordance with an exemplary embodiment of the disclosure.

Please refer to FIGS. 2A and 7 at the same time. In step S702, the core 200 obtains a virtual address (VA) for data accessing. In step S704, the core 200 determines whether the related information about the virtual address (VA) exists in the translation lookaside buffer TLB, that is, to determine whether any entry in the translation lookaside buffer TLB relates to the virtual address (VA) of the data accessing. If so (the entry corresponding to the virtual address (VA) of the data accessing is found in the translation lookaside buffer TLB), step S706 is performed, by which the core 200 reads the translation lookaside buffer TLB to get the reduced GCID (RGCID), the page granular identification code (iID), and the physical address (PA) of the data accessing. The physical address (PA) of the data accessing is included in a traditional page table entry. The process ends in step S708. The simplified key identification code KeyID_R may be composed of the reduced GCID (RGCID) and the page granular identification code (iID), and may be represented as {RGCID, iID}. According to the physical address (PA) of data accessing, the reduced GCID (RGCID), and the page granular identification code (iID), the read operation shown in FIG. 8 or the write operation shown in FIG. 9 may be performed. In step S704, if the core 200 determines that the information about the target address does not exist in the translation backup buffer TLB, the process proceeds to steps S710 and S712. Step S710 uses the table walk unit 207 in FIG. 2A to look up a page table (stored in the system memory 102) according to the virtual address (VA) of data accessing, and thereby obtain a page table entry PTE corresponding to the virtual address (VA). From the obtained page table entry PTE, the required physical address (PA) and page granular identification code (iID) are obtained. Step S712 retrieves the target RGCID from the RGCID register 205. Then, the process ends in step S708. The simplified key identification code KeyID_R may be composed of the reduced GCID (RGCID) and the page granular identification code (iID), and is represented as {RGCID, iID}. According to the physical address (PA) of data accessing, the reduced GCID (RGCID), and the page granular identification code (iID), the read operation shown in FIG. 8 or the write operation shown in FIG. 9 may be performed. The reduced GCID (RGCID) found in step S712 and the page table entry PTE found in step S710 are programmed into one entry in the translation lookaside buffer TLB.

Figure 8:
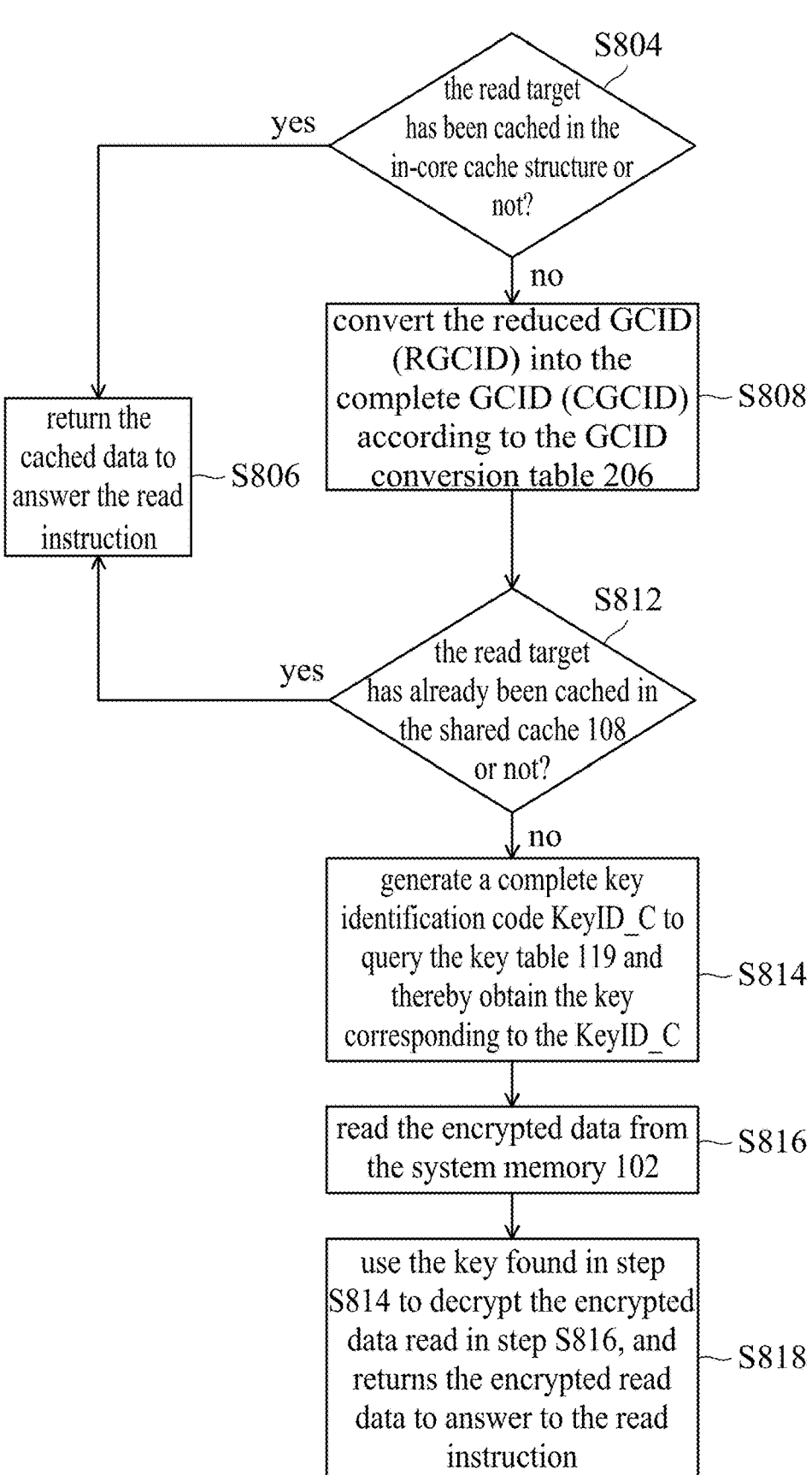
FIG. 8 illustrates the flow of a reading operation in accordance with an exemplary embodiment of the disclosure.

FIG. 8 illustrates the flow of a reading operation in accordance with an exemplary embodiment of the disclosure. When the core 200 executes a read instruction to read data from the system memory 102 (for example, executing an instruction "MOV AX, [1000]" to read the data of a virtual address 1000 from the system memory, and store the read data into the AX register), it will first perform the above-mentioned steps in FIG. 7 to obtain the physical address (PA) of the read data, the reduced GCID (RGCID), and the page granular identification code iID. Then, follow the steps shown in FIG. 8, the read data is obtained. The detailed description is as follows with reference to FIGS. 2A, 3, 4A, 4B, and 8.

Please refer to FIGS. 2A, 3, 4A, 4B, and 8 at the same time. Step S804 determines whether the read target requested by the core 200 has been cached in the in-core cache structure. Specifically, based on the physical address (PA) of the read target, the reduced GCID (RGCID), and the page granular identification code (iID), the first-level cache (the first-level instruction cache L1I or the first-level data cache L1D) determines whether the read target has been cached in the storage space of the first-level cache. If yes, step S806 is performed, and the first-level cache returns the cached data to answer the read instruction. If the read target has not been cached in the first-level cache, the second-level cache PL2 also operates. Based on the physical address (PA) of the read target, the reduced GCID (RGCID), and the page granular identification code (iID), the second-level cache PL2 determines whether the read target has been cached in the storage space of the second-level cache PL2. If yes, the process proceeds to step S806, and the second-level cache PL2 returns the cached data to answer the read instruction. If the read target has not been cached in the second-level cache PL2, the process proceeds to step S808.

In step S808, the core 200 converts the reduced GCID (RGCID) into the complete GCID (CGCID) according to the GCID conversion table 206. Specifically, the core 200 may search the GCID conversion table 206 to obtain the entry matching the reduced GCID (RGCID), and read the complete GCID (CGCID) from the matched entry. Then, step S812 is executed.

In step S812, the core 200 determines whether the read target has already been cached in the shared cache 108. Specifically, based on the physical address (PA) of the read target, the complete GCID (CGCID), and the page granular identifier (iID), the shared cache 108 determines whether the read target has already been cached the storage space of the shared cache 108. If yes, step S806 is executed, and the shared cache 108 returns the cached data to answer the read instruction. If the read target does not exist in the shared cache 108, step S814 is performed to generate a complete key identification code KeyID_C, and to query the key table 119 to obtain the key corresponding to the complete key identification code KeyID_C. The complete key identification code KeyID_C is a combination of the complete GCID (CGCID) and the page granular identification code (iID); for example, KeyID_C={CGCID, iID}. With the obtained key, step S816 is executed.

Step S816 reads the encrypted data from the system memory 102. Step S818 uses the key found in step S814 to decrypt the encrypted data read in step S816, generates read data, and returns the read data to answer to the read instruction. In step S818, the decrypted read data is further cached into the processor, and the corresponding reduced GCID (RGCID), complete GCID (CGCID), and page granular identification code (iID) are cached to the shared cache 108 and the in-core cache structure (including the first-level caches LII and LID, and the second-level cache PL2).

Figure 9:
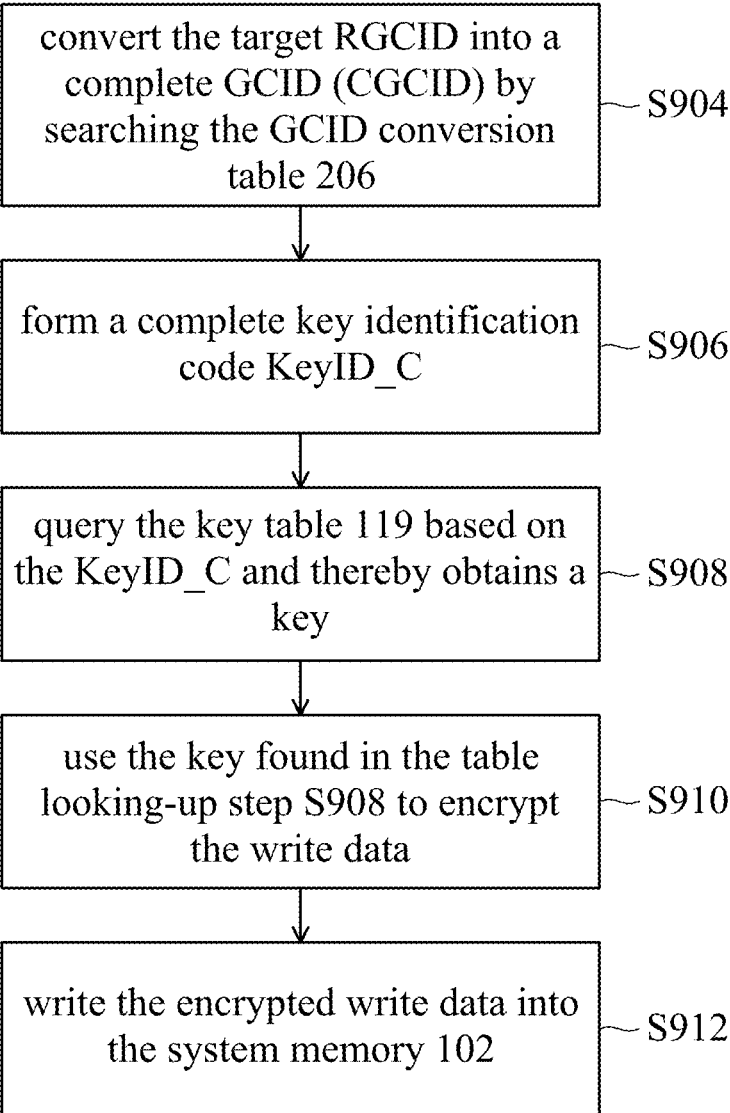
FIG. 9 illustrates the flow of data writing operations in accordance with an exemplary embodiment of the disclosure.

FIG. 9 illustrates the flow of data writing operations in accordance with an exemplary embodiment of the disclosure. When the core 200 executes a write instruction to program write data into the system memory 102 (for example, executing an instruction "MOV [1000], AX" to program the write data received by the AX register to the system memory at a virtual address 1000), it first performs the aforementioned steps shown in FIG. 7 to obtain a physical address (PA), a reduced GCID (RGCID), and a page granular identification code (iID) related to the write data, then, the write data is programmed into the system memory 102 according to the steps shown in FIG. 9. The detailed description is as follows in conjunction with FIGS. 2A, 3, 4A, 4B, and 9.

Please refer to FIGS. 2A, 3, 4A, 4B, and 9 at the same time. In step S904, the core 200 converts the target RGCID into a complete GCID (CGCID) by searching the GCID conversion table 206. In step S906, the core 200 combines the complete GCID (CGCID) and with the page granular identification code (iID) to form a complete key identification code KeyID_C. Then, the core 200 sends the data write request (including the write data, the physical address (PA) for the write data, and the complete key identification code KeyID_C, etc.) to the encryption and decryption engine 116 through the HIF 112. Then, the encryption and decryption engine 116 performs step S908.

In step S908, the encryption and decryption engine 116 queries the key table 119 based on the complete key identification code KeyID_C and thereby obtains a key. Step S910 uses the key found in the table looking-up step S908 to encrypt the write data. In step S912, the system memory controller 114 writes the encrypted write data into the system memory 102.

In another exemplary embodiment, step S906 may be executed by the encryption and decryption engine 116, and this application does not intend to limit this. In such an exemplary embodiment, the data write request that the core 200 issues to the encryption and decryption engine 116 does not contain the complete key identification code KeyID_C. Instead, the data write request contains the complete GCID (CGCID) and the page granular identification code (iID).

Referring to FIG. 9, in the step of programming the write data into the system memory 102, the operations on the caches (including the first-level caches LII and LID, the second-level cache PL2, and the shared cache 108) may have some difference depending on the cache type of the write data. For example, when the cache type corresponding to the write data is WT (Write-Through), for the cache hit case, the write data is first programmed into the hit cache (the first-level cache L1I/LID, second-level cache PL2, or shared cache 108), and then immediately further programmed into the system memory 102. When the cache type corresponding to the write data is WB (Write-Back), for the cache hit case, the write data is first programmed into the hit cache (the first-level cache L1I/LID, second-level cache PL2, or shared cache 108), but is not be immediately programmed into the system memory 102. The processor 100 waits for a proper event (for example, the corresponding cache is full) and then programs the write data into the system memory 102. As mentioned above, in this disclosure, the cache hit/miss event is determined based on the page granular identification code (iID), and the GCID information (the RGCID for the in-core cache structure, or the CGCID for the shared cache 108).

The key identification code KeyID is further explained below.

In an exemplary embodiment, the complete GCID (CG-CID, 10 bits for example) of each virtual machine (VM guest) is marked in the virtual machine control structure VMCS by a virtual machine monitor. The page granular identification code iID may be 6 bits and is attached to each page table entry (PTE) of a central processing unit (CPU) or an input and output memory management unit (IOMMU). In an exemplary embodiment, the page granular identification code iID corresponding to each page is allocated by software. When converting a virtual address VA to a physical address PA, the corresponding page granular identification code iID may be generated. The complete GCID (CGCID) may also be loaded into, for example, reserved bits of a context list managed by the IOMMU.

The key identification code KeyID (={GCID, iID}) needs to be tracked all the way in the CPU core and the cache system. The tracking method may referring to the aforementioned examples, using the simplified key identification code KeyID_R (={RGCID, iID}) inside the core, and using the complete key identification code KeyID_C (={CGCID, iID}) outside the core. If the cache space is sufficient, the complete key identification code KeyID_C (={CGCID, iID}) may also be used in the core to speed up the accessing of the data.

Figure 10:
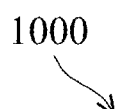
FIG. 10 illustrates the encryption and decryption modes 1000 corresponding to the different values of the page granular identification code iID.

FIG. 10 illustrates the encryption and decryption modes 1000 corresponding to the different values of the page granular identification code iID. The encryption and decryption are performed in granularity of pages.

When the page granular identification code (iID) is 6'h00, it means that a unified key is adopted. When the page granular identification code (iID) is 6'h01, it means that this block does not need encryption or decryption. When the page granular identification code (iID) is 6'h02, the encryption and decryption are performed in granularity of GCID. Only the GCID in the key identification code KeyID is referred to in the key identification. A unified key is applied to the whole host, and each virtual machine has its own unified key. When the page granular identification code (iID) is 6'h04~6'h3B, the host and each virtual machine are encrypted in granularity of pages. The different keys are isolated according GCID (global context isolated) as well as iID (page isolated). For example, the host and the virtual machines each may have 56 keys, which are alternately used in page encryption.

This paragraph introduces the flush instruction CKEYFLUSH in detail, which specifies a complete key identification code KeyID, or a partial key identification code subKeyID to flush the cache structure. The flushing may further specify its flushing target (e.g., only to flush the in-core cache structure and the shared cache, or only to flush the translation lookaside buffer TLB). In response to the flush instruction, the flush controller 204 of FIG. 2A may operate. The flush instruction CKEYFLUSH may be executed corresponding to a target entry released from the GCID conversion table 206 (for example, in response to a newly activated virtual machine). The execution of the flush instruction CKEYFLUSH may use the registers EAX and EBX.

The register EAX is used to specify which cache to flush, and whether to perform the cache flush according to a specified KeyID or a specified subKeyID (partial of a complete key identification code KeyID). Bits [7:0] of register EAX may be used as follows: the value "0" means to flush those completely match the specified key identification code KeyID (={GCID, iID}); the value "1" means to flush those match the specified GCID; the value "2" means to flush those match the specified iID; and the value "4" means to flush based on a page address (a physical address PA, or a virtual address VA). Bit 8 of register EAX indicates whether to flush the translation lookaside buffer TLB. For example, when bit 8 of the register EAX is 0, it means that the flushing function about the translation lookaside buffer TLB is disabled. When bit 8 of the register EAX is 1, it means that the translation lookaside buffer TLB needs to be flushed. Bit 9 of register EAX indicates whether to flush the in-core cache structure and shared cache. For example, when bit 9 of the register EAX is 0, it means that the cache flushing function about the in-core cache structure and the shared cache is disabled. When bit 9 of the register EAX is 1, it means that the in-core cache structure and the shared cache need to be flushed.

The register EBX is for setting the key identification code KeyID or the partial key identification code subKeyID to indicate the flush target. For example, when bits [7:0] of register EAX is "0", the complete key identification code KeyID is entered in the register EBX. When bits [7:0] of register EAX is not "0", only the partial key identification code subKeyID is entered in register EBX. Specifically, when bits [7:0] of register EAX is "1", an GCID (an RGCID or a CGCID) is entered in the register EBX. When bit [7:0] value of the register EAX is "2", a page granular identification code iID is entered in the register EBX. When bit [7:0] of the register EAX is "4", a page address (such as a physical address PA, or a virtual address VA) is entered in the register EBX.

The secure operations of the encryption and decryption engine 116 are introduced as follows. In an exemplary embodiment, a first MMIO space is allocated in the system memory 102 to manage the encryption and decryption engine 116, and only the predefined secure micro-operations (uops) are permitted to access to the first MMIO space. The platform setting instruction PlatformSet uses these secure uops to build the key table 119 required in the operations of the encryption and decryption engine 116. These secure uops are different from the general uops used to access a data space within the system memory 102. When the general uops (that is, the uops other than the secure uops) try to manage the encryption and decryption engine 116 through the first MMIO space, they are rejected. The details are described later in conjunction with FIG. 11.

The BIOS may first configure an MSR SEME-_KEYTABLE_BASE to set the base address of the first MMIO space, and then the key table 119 may be established through the platform setting instruction PlatformSet.

Figure 11:
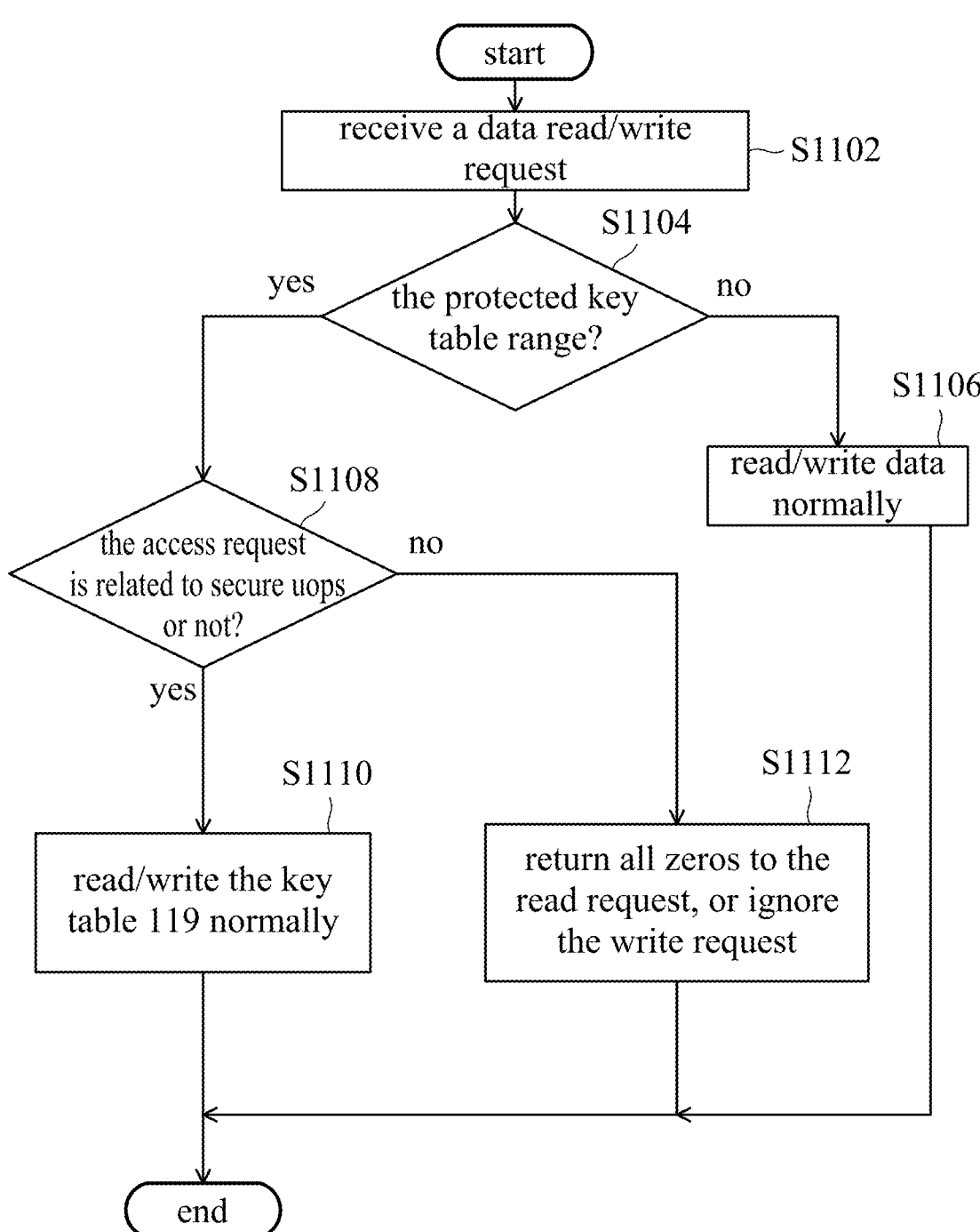
FIG. 11 shows a flow chart illustrating a protection method of the key table 119 in accordance with an exemplary embodiment of the disclosure.

FIG. 11 shows a flow chart illustrating a protection method of the key table 119 in accordance with an exemplary embodiment of the disclosure, which may be applied to the MMIO checker 208. In an exemplary embodiment, the core accesses the key table 119 in an MMIO manner. The core may issue MMIO read and write requests to the MMIO checker 208 for inspection. Step S1102 receives a data read/write request. In step S1104, the MMIO checker 208 checks whether the read/write request falls into the protected MMIO space. Specifically, the MMIO checker 208 may include a configuration table that records the address range of the protected MMIO space. By checking whether the access address indicated through the read/write request is protected in the configuration table, it is determined whether the read/write request falls into the protected MMIO space. If no (that is, the read/write request does not fall into the protected MMIO space), step S1106 is performed, by which the core reads/writes data normally. Otherwise (that is, the read/write request falls into the protected MMIO space), step S1108 is performed, by which the MMIO checker 208 checks whether the access request is related to secure uops. Specifically, the MMIO checker 208 checks whether the uops included in the access request are secure uops. In an exemplary embodiment, the secure uops may be identified through their opcodes. If the read/write request relates to secure uops, step S1110 is performed, by which the core reads/writes key table 119 normally. On the contrary (that is, the uops included ub the read/write request are not secure uops), step S1112 is performed, by which the core returns all zeros to the read request, or ignores the write request (that is, no operation is performed).

The software may execute the platform setting instruction PlatformSet to generate keys. In the execution of the platform setting instruction PlatformSet, a space may be released to store the newly generated keys.

An MSR SEME_KEYTABLE_BASE may be designed as follows.

Bit 0 of the MSR SEME_KEYTABLE_BASE may be used to lock the key table 119.

Bits [MaxPhysADDR-1:8] of the MSR SEME_KEYTABLE_BASE may contain a base address of the key table 119.

In an exemplary embodiment, the encryption and decryption engine 116 may support the AES-XTS 128 cryptographic algorithm. Taking a dynamic random access memory (DRAM) as an example, the minimum block size is 512 bits, the same size as a cache line. The location of the encryption block may be represented by the following two parts, including: a physical address, which is PA [MaxPhysADDR:6]; and a block sequence number, such as numbers 0~3 of AES-XTS 128.

In an exemplary embodiment, the MKMET with global context isolation may be activated with the input-output virtualization (IOV). The host operating system (host OS)/ virtual machine monitor (VMM) may use a fixed key (for example, referring to KeyID 0) to encrypt the shared memory between the guest virtual machine (guest VM) and the virtual machine monitor (VMM), for communication between the guest VM and the VMM.

Regarding the specified input/output, the host operating system (host OS)/virtual machine monitor (VMM) may program the key identification code KeyID into a physical address contained in the page table of the input and output memory management unit (IOMMU) or the virtualization technology (VT-d), to correspond to information contained in the extended page table (EPT). In this way, this space may be accessed by direct memory accessing (DMA) without using any input and output devices. This accessing is also irrelevant to the guest VM, the host operating system (Host OS), and the I/O driver in the VMM.

The platform setting instruction PlatformSet using secure uops may be executed to build the key table 119. The design of the platform setting instruction PlatformSet is as follows.

The platform setting instruction PlatformSet may use a register EAX (the fourth register) to present the function leaf, and also use another register EBX/ECX/EDX to set the parameters of the function leaf.

For example, when the register EAX is set to 1, the platform setting instruction PlatformSet can use the secure uops to access the first MMIO space to securely manage the key table 119 and thereby improve the security of the encryption and decryption engine 116. When register EAX is set to 2, the platform setting instruction PlatformSet may use these secure uops to access a second MMIO space to securely manage another high-security function engine (e.g., an AI acceleration engine). That is to say, through the register EAX, the function leaf may be changed, and the platform setting instruction PlatformSet may be switched to realize safe access to the second MMIO space, to securely configure the corresponding high-security function engine (such as the AI acceleration engine).

By setting of the register EAX (e.g., EAX=1), the platform setting instruction PlatformSet may be applied to securely manage the key table 119. The register EBX (first register) may specify a system memory address, indicating the storage of a key data structure in the system memory 102. The key data structure shows information about a key identification code KeyID, and its corresponding partial keys (such as Key1, and Key2) and its corresponding encryption and decryption mode. Specifically, the key data structure is: at offset 0B (byte, the same below), it stores key identification code KeyID of size 4B, which is {GCID, iID} (the same as that defined in the register EDX described below); at offset 4B, it stores control parameters of size 4B (the same as those defined in register ECX described below); at offset 8B, there is a reserved field of size 56B; at offset 64B, it stores a 64B parameter LOC_KEY1, which is a software-configurable tweak key; and, at offset 128B, it stores a 64B parameter DATA_KEY2, which is a software-configurable data key. In another exemplary embodiment, the key identification code KeyID_C of size 4B is stored at offset 0B of the key data structure, which is {CGCID, iID}.

The key data structure may be prepared in the system memory 102, and its storage address may be stored in the register EBX. By executing the platform setting instruction PlatformSet, one empty entry in the key table 119 may be newly filled according to the key data structure, or the entry, corresponding to the key identification code KeyID, in the key table 119 may be updated according to the key data structure. In addition to programming the key data structure in the system memory 102, the parameters presented in the key data structure may also be directly programmed into the registers. The platform setting instruction PlatformSet is executed based on the registers to manage the entries in the key table 119. The details are described below.

The register EDX (the third register) is configured to set the key identification code KeyID, and is named a key identification code (KeyID) register.

The register ECX (the second register) is configured to store control parameters, and is named a control parameter (KeyID) register.

Bits [7:0] of the register ECX may be configured for the following settings. When bits [7:0] of register ECX is 0, it indicates that the keys (for example, Key1 and Key2) are provided through software in response to the execution of the PlatformSet instruction. Note that the keys (Key1 and Key2) provided by the software need to be stored in the aforementioned key data structure in advance. When bits [7:0] of register ECX is 1, it indicates that the keys (for example, Key1 and Key2) are generated by the processor 100 in response to the execution of the PlatformSet instruction. In response to the execution of the PlatformSet instruction, the processor 100 operates a random number generator of hardware to generate these keys. Every time the processor 100 is reset, the keys are discarded. When bits [7:0] of register ECX is 2, it indicates that the PlatformSet instruction is executed to clear the keys related to the key identification code KeyID. Every execution of the PlatformSet instruction switches the encryption and decryption to a unified key mode. When bits [7:0] of register ECX is 3, it indicates that the PlatformSet instruction is executed to turn off the encryption and decryption about the key identification code KeyID listed in the key table 119 and marked through the register EDX. When bits [7:0] of register ECX is 4, it is determined how many key identification codes are used in the encryption and decryption engine 116. When bits [7:0] of register ECX is 5, it indicates whether each key identification code used in the encryption and decryption engine 116 has been mapped to a key.

Bits [23:8] of register ECX may be used to select a cryptographic algorithm. For example, the value "00000000" represents the AES-XTS 128 cryptographic algorithm; the value "00000001" represents the AES-XTS 256 cryptographic algorithm; and the value "00000010" represents the SM4 block message cipher algorithm.

In an exemplary embodiment, the key function of the platform setting instruction PlatformSet is activated by software, to manage the different keys according to their corresponding key identification codes (KeyID). In an exemplary embodiment, the software sets the value of the register EAX to 1, and configures the register EBX to store an address of the system memory to point to the aforementioned key data structure, and thereby the key function is invoked. In another exemplary embodiment, the invocation is achieved by setting the register EAX to 1 and configuring the registers ECX and EDX to enter the data defined in the key data structure. After the successful execution of the key function, the register EAX is cleared (reset to zero, the same below), and the ZF bit, CF bit, PF bit, AF bit, OF bit, and SF bit of the flag register EFLAGS are also cleared. If the execution of the key function fails, the reason of the failure is presented in the register RAX, the ZF bit of the flag register EFLAGS is set to 1, and the CF bit, PF bit, AF bit, OF bit, and SF bit of the flag register EFLAGS are cleared.

After the execution of the platform setting instruction PlatformSet, the execution result may be returned to the core through the registers as detailed below.

Through the register ECX, the information returned to the core may be: a programming success status; a programming instruction invalid status; a cryptographic algorithm invalid status; or a key table reading failure status.

The register EDX may use its bits [9:0] to return the number of keys.

In an exemplary embodiment, a processor with an encryption and decryption engine that encrypts and decrypts data of a system memory that is coupled to the processor is shown. The encryption and decryption engine includes a key table. In response to a platform setting instruction, the processor reads a key identification code from a third register (EDX, or named a key identification code register), and reads control parameters from a second register (ECX, or named a control parameter register). Based on the control parameters, the processor manages a key, associated with the key identification code, in the key table.

In an exemplary embodiment, the processor configures a first memory-mapped input and output space in the system memory to manage the key table, and restricts access to the first memory-mapped input and output space with a plurality of secure micro-operations, These secure micro-operations are different from the general micro-operations used to access the data space within the system memory.

The various register settings mentioned above may be modified according to user's needs.

In addition to the processor 100, the computer system introduced above may also include the system memory 102. Any electronic device that uses the above processor 100 to encrypt and decrypt the system memory 102 involves the technology of the disclosure. In another exemplary embodiment, a system memory encryption and decryption method is developed based on the above concepts and applied to a computer system.

Through the computer system and the system memory encryption and decryption method proposed in the disclosure, the key identification code may be configured to isolate the different global contexts. The host and the virtual machines are more isolated from each other, so that the security of the system memory of the computer system is improved. In addition, through the platform setting instruction proposed in the disclosure, the key identification codes may be configured in a secure manner.

While the disclosure has been described by way of example and in terms of the preferred embodiments, it should be understood that the disclosure is not limited to the disclosed embodiments.

What is claimed is:

1. A computer system, comprising:
a processor, including an encryption and decryption engine that encrypts and decrypts a system memory that is coupled to the processor, wherein the encryption and decryption engine includes a key table;
wherein the processor is configured to:
in response to a platform setting instruction, read a key identification code from a key identification code register, and reads control parameters from a control parameter register; and
based on the control parameters, manage a key, associated with the key identification code, in the key table,
wherein:
the processor allocates a first memory-mapped input and output (MMIO) space within an address space of the system memory to provide secure access to the key table of the encryption and decryption engine;
access to the first MMIO space is restricted to be performed only by a plurality of secure micro-operations;
the secure micro-operations are different from general micro-operations used to access a data space of the system memory; and
execution of the platform setting instruction invokes the plurality of secure micro-operations to access the first MMIO space.

2. The computer system as claimed in claim 1, wherein:
the processor further includes a model-specific register configured to define a location of the first memory-mapped input and output space; and
the processor fills in the model-specific register when running a basic input and output system.

3. The computer system as claimed in claim 1, wherein:
according to the key as well an encryption and decryption mode obtained from the key table based on the key identification code, the encryption and decryption engine encrypts and decrypts target data of the system memory.

4. The computer system as claimed in claim 1, wherein:
the processor executes the platform setting instruction by running a basic input and output system, to manage the key, associated with the key identification code, in the key table.

5. The computer system as claimed in claim 1, wherein:
the key, associated with the key identification code, in the key table is set or cleared according to the control parameters.

6. The computer system as claimed in claim 1, wherein:
according to the control parameters, encryption and decryption according to the key associated with the key identification code are enabled or disabled, or encryption and decryption according to a unified key are enabled.

7. The computer system as claimed in claim 1, wherein:
according to the control parameters, encryption and decryption of the system memory is based on a block message cipher algorithm in an XTS mode; and
corresponding to the block message cipher algorithm in the XTS mode, each key is further divided into a first partial key and a second partial key.

8. The computer system as claimed in claim 1, wherein:
according to the control parameters, the key is generated by software or by a random number generator of hardware.

9. The computer system as claimed in claim 1, wherein:
the platform setting instruction uses a first setting of a secure function register to realize management of the key table, and uses a second setting of the secure function register to realize secure access to a second memory-mapped input and output space of the system memory; and
the second memory-mapped input and output space is allocated to another high security function engine.

10. A method for system memory encryption and decryption, comprising:
allocating a first memory-mapped input and output (MMIO) space within an address space of a system memory to provide secure access to a key table, wherein the key table is built within an encryption and decryption engine that operates to encrypt and decrypt the system memory;
in response to a platform setting instruction, executing a plurality of secure micro-operations to access the first MMIO space, wherein the secure micro-operations are different from general micro-operations used to access a data space of the system memory; and
performing, by the plurality of secure micro-operations invoked by the platform setting instruction:
reading a key identification code from a key identification code register;
reading control parameters from a control parameter register; and
based on the control parameters, managing a key, associated with the key identification code, in the key table.

11. The method as claimed in claim 10, further comprising:

through a basic input and output system run by a processor equipped with the encryption and decryption engine, filling in a model-specific register to define a location of the first memory-mapped input and output space.

12. The method as claimed in claim 10, wherein:

according to the key as well an encryption and decryption mode obtained from the key table based on the key identification code, the encryption and decryption engine encrypts and decrypts target data of the system memory.

13. The method as claimed in claim 10, wherein:

a processor equipped with the encryption and decryption engine executes the platform setting instruction by running a basic input and output system, to manage the key, associated with the key identification code, in the key table.

14. The method as claimed in claim 10, wherein:

the key, associated with the key identification code, in the key table is set or cleared according to the control parameters.

15. The method as claimed in claim 10, wherein:

according to the control parameters, encryption and decryption according to the key associated with the key identification code are enabled or disabled, or encryption and decryption according to a unified key are enabled.

16. The method as claimed in claim 10, wherein:

according to the control parameters, encryption and decryption of the system memory is based on a block message cipher algorithm in an XTS mode; and corresponding to the block message cipher algorithm in the XTS mode, each key is further divided into a first partial key and a second partial key.

17. The method as claimed in claim 10, wherein:

according to the control parameters, the key is generated by software or by a random number generator of hardware.

18. The method as claimed in claim 10, wherein:

the platform setting instruction uses a first setting of a secure function register to realize management of the key table, and uses a second setting of the secure function register to realize secure access to a second memory-mapped input and output space of the system memory; and the second memory-mapped input and output space is allocated to another high security function engine.

\* \* \* \* \*